United States Patent
Park et al.

(10) Patent No.: US 12,529,628 B2
(45) Date of Patent: Jan. 20, 2026

(54) MICROBEADS AND PREPARATION METHOD THEREFOR

(71) Applicant: LG Chem, Ltd., Seoul (KR)

(72) Inventors: Byung Hyun Park, Daejeon (KR); Byoung Hyoun Kim, Daejeon (KR); Su Youn Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1273 days.

(21) Appl. No.: 16/979,730

(22) PCT Filed: Oct. 22, 2019

(86) PCT No.: PCT/KR2019/013875
§ 371 (c)(1),
(2) Date: Sep. 10, 2020

(87) PCT Pub. No.: WO2020/085757
PCT Pub. Date: Apr. 30, 2020

(65) Prior Publication Data
US 2021/0041332 A1    Feb. 11, 2021

(30) Foreign Application Priority Data

Oct. 22, 2018 (KR) .................. 10-2018-0125755
Oct. 21, 2019 (KR) .................. 10-2019-0130775

(51) Int. Cl.
*G01N 1/28* (2006.01)
*C01B 33/18* (2006.01)

(52) U.S. Cl.
CPC ............... *G01N 1/28* (2013.01); *C01B 33/18* (2013.01)

(58) Field of Classification Search
CPC ...... G01N 1/28; G01N 33/5375; C01B 33/18; B01J 19/0086
See application file for complete search history.

(56) References Cited

U.S. PATENT DOCUMENTS

| | | | |
|---|---|---|---|
| 2002/0004199 A1 | 1/2002 | Hechinger | |
| 2004/0067649 A1* | 4/2004 | Hellring | B82Y 30/00 438/692 |
| 2006/0070937 A1 | 4/2006 | Rustamov et al. | |

(Continued)

FOREIGN PATENT DOCUMENTS

| CN | 104053716 A | 9/2014 |
|---|---|---|
| CN | 104968403 A | 10/2015 |

(Continued)

OTHER PUBLICATIONS

Sankaranarayanapillai et al, Cooperative Acid-Base Effects with Functionalized Mesoporous Silica Nanoparticles: Applications in Carbon-Carbon Bond-Formation Reactions, 2009, Chemistry A European Journal, 15, 29, 7052-7062 (Year: 2009).*

(Continued)

Primary Examiner — Matthew D Krcha
Assistant Examiner — Austin Q Le
(74) Attorney, Agent, or Firm — Lerner David LLP

(57) ABSTRACT

Microbeads capable of controlling the pH of a sample are provided. The microbeads can control the pH of a sample to be equal, similar or close to a target pH without an automated device and the like such as an additional valve system for controlling pH, and thus could be readily applied to fields requiring pH control.

6 Claims, 2 Drawing Sheets

Glass microbead

Glass microbead coated with acid/base components for pH control

(56) References Cited

U.S. PATENT DOCUMENTS

| | | |
|---|---|---|
| 2007/0191571 A1 | 8/2007 | Sink et al. |
| 2008/0194855 A1 | 8/2008 | Gottschalk-Gaudig et al. |
| 2008/0291444 A1 | 11/2008 | Donaldson et al. |
| 2013/0130917 A1 | 5/2013 | Cai |
| 2014/0323634 A1 | 10/2014 | Kim et al. |
| 2014/0367338 A1 | 12/2014 | Gu et al. |
| 2015/0111241 A1 | 4/2015 | Hubel et al. |
| 2015/0343421 A1* | 12/2015 | Boday ............... B01J 20/28016 544/215 |
| 2019/0135654 A1 | 5/2019 | Enomura et al. |
| 2019/0144681 A1 | 5/2019 | Enomura et al. |
| 2019/0144691 A1 | 5/2019 | Enomura et al. |
| 2019/0153246 A1 | 5/2019 | Enomura et al. |
| 2019/0211209 A1 | 7/2019 | Enomura et al. |
| 2019/0217384 A1 | 7/2019 | Enomura et al. |
| 2019/0292374 A1 | 9/2019 | Enomura et al. |
| 2019/0338137 A1 | 11/2019 | Enomura et al. |

FOREIGN PATENT DOCUMENTS

| | | | |
|---|---|---|---|
| CN | 107854449 A | 3/2018 | |
| CN | 106337187 B | * 10/2018 | ............. B82Y 30/00 |
| CN | 109195905 A | 1/2019 | |
| EP | 3466870 A1 | 4/2019 | |
| JP | H01188445 A | 7/1989 | |
| JP | 2003201112 A | 7/2003 | |
| JP | 2003535338 A | 11/2003 | |
| JP | 2008514425 A | 5/2008 | |
| JP | 2008521980 A | 6/2008 | |
| JP | 2009039656 A | 2/2009 | |
| JP | 2015078105 A | 4/2015 | |
| JP | 2018076218 A | 5/2018 | |
| KR | 100876657 B1 | 1/2009 | |
| KR | 20110041850 A | 4/2011 | |
| KR | 20150014560 A | 2/2015 | |
| KR | 101613403 B1 | 4/2016 | |
| WO | 2013158737 A1 | 10/2013 | |
| WO | 2017208501 A1 | 12/2017 | |

OTHER PUBLICATIONS

International Search Report for Application No. PCT/KR2019/013875 mailed Feb. 18, 2020, 3 pages.

Shentu, J. et al., "Reactive blue F3GA immobilized chitosan microspheres Adsorption of catalase", Journal of Zhejiang University (Science Edition) Dec. 2005, pp. 674-684, vol. 32, Issue No. 6. [English translation of abstract only].

Fan, H. et al., "Preparation of novel collagen materials by protein-2 inorganic nanohybridization", Functional Materials, Jun. 2004, pp. 373-382, vol. 35, Isssue 3. [English translation of abstract only].

Guo, Q. et al., "Effect of Adsorbent on Column Chromatography to Separate Fluorescent Yellow and Methylene Blue BB" Chemical Education, May 2017, pp. 47-52, vol. 38, Issue 10. [English translation of abstract only].

Search Report dated Sep. 28, 2022 from the Office Action for Chinese Application No. 201980014541.0 issued Oct. 8, 2022, pp. 1-3.

Extended European Search Report including Written Opinion for Application No. 19875170.3 dated Feb. 25, 2021, 7 pages.

* cited by examiner

[Fig. 1]
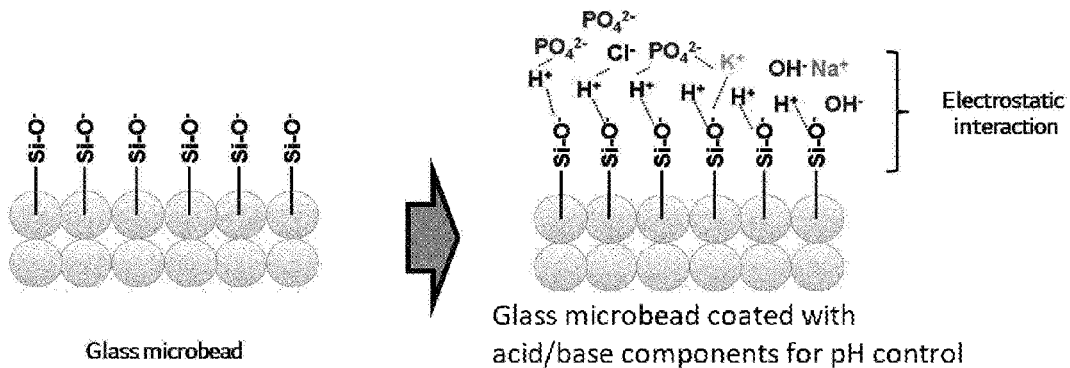
Glass microbead
Glass microbead coated with acid/base components for pH control
[Fig. 2]
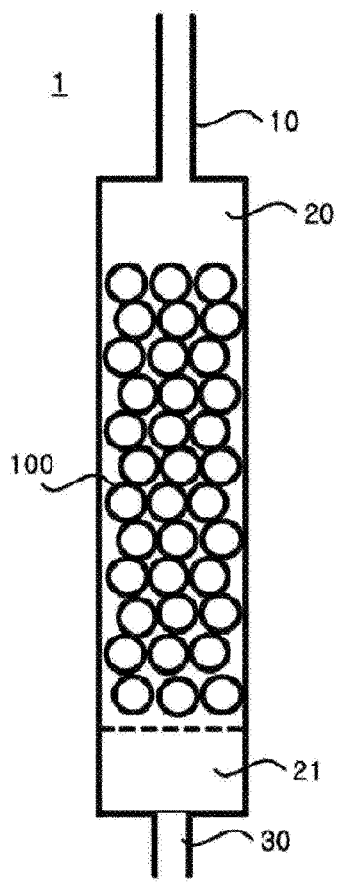

[Fig. 3]
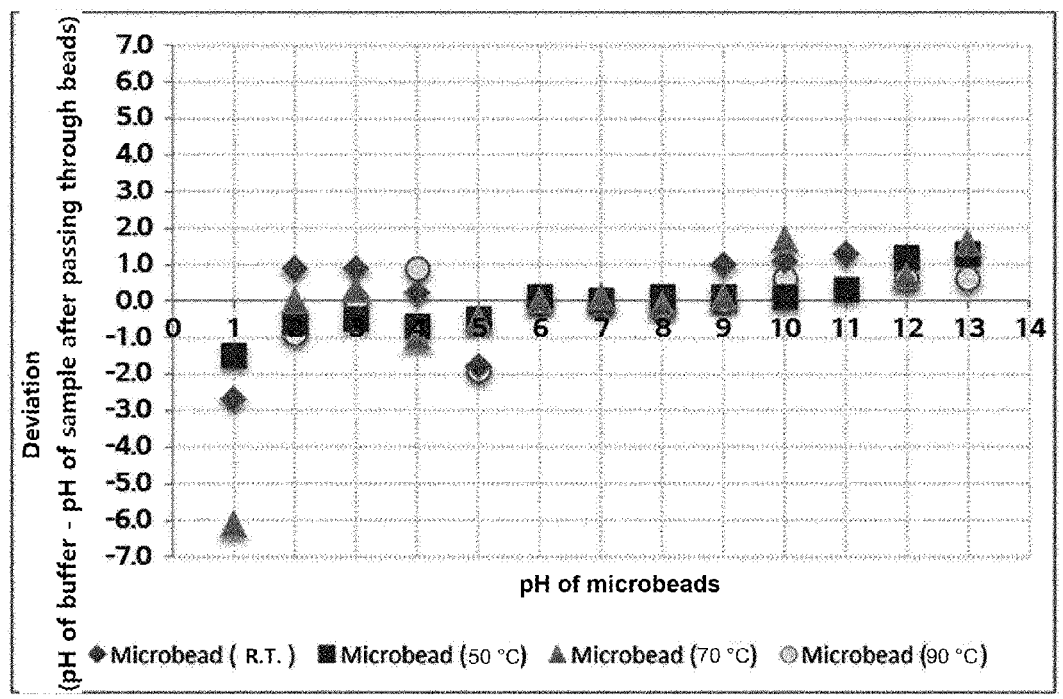

MICROBEADS AND PREPARATION METHOD THEREFOR

CROSS-REFERENCE TO RELATED APPLICATION

This application is a national phase entry under 35 U.S.C. § 371 of International Application No. PCT/KR2019/013875, filed Oct. 22, 2019, which claims priority to Korean Patent Applications No. 10-2018-0125755 filed on Oct. 22, 2018 and No. 10-2019-0130775 filed on Oct. 21, 2019, the disclosures of which are incorporated herein by reference.

BACKGROUND OF THE INVENTION

1. Field of the Invention

The present invention relates to microbeads which enables to adjust pH of a sample, and to microbeads that can easily adjust pH of a sample by passing the sample through microbeads controlled to a desired pH.

2. Description of the Related Art

In general, in order to adjust pH, an acid or base solution is added to a sample, pH value of the sample is measured by a pH meter or a pH paper sensor, and optimization is carried out to reach a desired pH value.

However, such series of processes in the prior art are not economical because they have disadvantages of being labor intensive and time consuming. In addition, the conventional automatic pH control system requires a lot of time and money to automate by a valve system the process of observing pH of the sample in real time through the electrochemical system by adding acid or base continuously.

Therefore, there is a need for materials and methods that can adjust the pH in a simple and economic way.

SUMMARY OF THE INVENTION

It is an object of the present invention to provide microbeads which allow for simple and rapid adjustment of a sample to a desired specific pH.

In order to solve the above problems, the present invention provides microbeads having conjugated acid and conjugate base adsorbed onto Si—OH groups on the surface of the microbeads by electrostatic interaction.

The microbeads may be used for controlling the pH value of the sample.

According to one embodiment, the microbeads may have a specific pH selected from pH 1 to 13.

According to one embodiment, the microbeads may be silica-based glass microbeads.

According to one embodiment, the average diameter of the microbeads may be 100 to 300 μm.

According to other embodiment, the present invention provides a method for manufacturing the microbeads, comprising the steps of:

immersing the microbeads in a buffer solution containing conjugate acid and conjugate base to cause the conjugate acid and conjugate base components to be adsorbed onto the microbeads; and the solvent to prepare microbeads with controlled pH.

According to one embodiment, the volatilizing the solvent may be performed in an inert gas atmosphere at 40 to 70° C.

In addition, the inert gas may comprise at least one selected from the group consisting of nitrogen, argon and helium.

According to another embodiment of the present invention, it is possible to provide a device for controlling pH value of a sample, containing the microbeads.

According to still other embodiment of the present invention, it is possible to provide a pH adjusting system for controlling pH value of a sample, containing the microbeads.

Other specific details of embodiments of the present invention are included in the following detailed description.

EFFECT OF THE INVENTION

According to the present invention, it is possible to control a sample to a desired pH in a simple and easy way without the need for an automated device such as an additional valve system for pH adjustment. Therefore, it is possible to save time and money and apply to various fields usefully.

BRIEF DESCRIPTION OF THE DRAWINGS

FIG. 1 is a schematic diagram showing the microbeads.

FIG. 2 is a schematic diagram of the device according to an embodiment of the present invention.

FIG. 3 is a graph showing the relationship between deviation of the result values and pH of the microbeads.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

As used herein, the term "bead" may be used interchangeably with "beads" unless otherwise stated. Also, unless stated otherwise, the singular expression of a term may be understood to include the plural expression of the term, and the plural expression of the term may be understood to include the singular expression of the term.

Unless stated otherwise in the present specification, the expression "to" is used as an expression including a corresponding numerical value. Specifically, for example, the expression "1 to 2" means not only including 1 and 2, but also including all values between 1 and 2.

Hereinafter, the microbeads and the preparation method thereof according to the embodiment of the present invention will be described in more detail.

The present invention provides a method for manufacturing the microbeads, comprising the steps of:

immersing the microbeads in a buffer solution containing conjugate acid and conjugate base to cause the conjugate acid and conjugate base components to be adsorbed onto the microbeads; and volatilizing the solvent to prepare microbeads with controlled pH.

The sample can be adjusted to the desired pH by passing the sample through the microbeads prepared as described above.

According to one embodiment, the sample may be a neutral sample, for example, may be a sample having a value of pH 6.8 to 7.9, for example pH 7.

According to one embodiment, the volatilizing the solvent may be carried out in an inert gas atmosphere at 40 to 70° C., for example 50° C. The inert gas may include, for example, one or more selected from the group consisting of nitrogen, argon, and helium, and for example, nitrogen gas ($N_2$) may be used. It is also possible to volatilize the solvent under reduced pressure during such inert gas purge.

According to one embodiment, the solvent is not particularly limited as long as it is a substance that dissolves each substance well according to the type of conjugate acid and conjugate base, for example, it may include distilled water, deionized water and the like.

According to one embodiment, the buffer solution may have a specific pH selected from pH 1 to 13, and the microbead may be controlled to have a specific pH selected from pH 1 to 13, depending on the respective buffer solution. Specifically, the microbeads may be immersed in a buffer solution having a specific pH selected from pH 1 to 13 to cause the microbeads to have pH that is the same as or similar to or close to that of the buffer solution.

According to one embodiment, the microbeads may include, for example, silica-based microbeads, and specifically, for example, silica-based glass microbeads. The microbeads may have salts coated well on the surface during the manufacturing process and may have OH-groups on the surface so that the salts coated on the surface of the microbead can be eluted into the sample when the sample passes through the microbeads. That is, the conjugate acid and the conjugate base contained in the buffer solution are adsorbed onto the Si—OH group on the surface of the microbead by the electrostatic interaction, so that the conjugate acid and the conjugate base can be eluted when the sample passes through the beads. As such, the microbeads to be used in the present invention can serve as a support in the buffer solution, and can be used without particular limitation as long as all components in the buffer solution are well adsorbed. In the case the microbead having a porous structure, it may facilitate adjusting pH of a larger volume of sample due to its large surface area. In addition, the average diameter of the microbead is not particularly limited, and may be, for example, 100 to 300 μm, for example, 150 to 210 μm. As described above, a schematic diagram of the microbeads with controlled pH is shown in FIG. 1.

According to one embodiment, the buffer solution can be prepared for each desired pH concentration by using conjugate acid and conjugate base compound reagents as shown in Table 1.

TABLE 1

Hydrochloric acid/Potassium chloride
Glycine/Hydrochloric acid
Potassium hydrogen phthalate/Hydrochloric acid
Citric acid/Sodium citrate
Sodium acetate/Acetic acid
Potassium hydrogen phtaalate/Sodium hydroxide
Disodium hydrogen phthalate/Sodium dihydrogen orthophospate TABLE 1-continued Dipotassium hydrogen phthalate/Potassium dihydrogen orthophospate
Potassium dihydrogen orthophosphate/sodium hydroxide
Barbitone sodium/Hydrochloric acid
Tris (hydroxylmethyl) aminomethane/Hydrochloric acid
Sodium tetraborate/Hydrochloric acid
Glycine/Sodium hydroxide
Sodium carbonate/Sodium hydrogen carbonate
Sodium tetraborate/Sodium hydroxide
Sodium bicarbonate/Sodium hydroxide
Sodium hydrogen orthophosphate/Sodium hydroxide
Potassium chloride/Sodium hydroxide More specifically, a buffer solution having a desired pH may be prepared by adjusting a ratio of conjugate base and acid according to the Henderson-Hasselbach equation of the following equation 1:

$$-\log[H_3O^+] = -\log K_a - \log\frac{[HA]}{[A^-]} \quad \text{[Equation 1]}$$

$$pH = pK_a - \log\frac{[HA]}{[A^-]}$$

$$pH = pK_a + \log\frac{[A^-]}{[HA]}$$

wherein, $K_a$ is an acid dissociation constant, [HA] is a concentration of an acid, [A−] is a concentration of a conjugate base, and [H+] is a concentration of hydrogen ion.

In other words, the buffer solution having more than pH 0 and less than pH 14 or from pH 1 to pH 13 may be prepared by a reagent combination of weak acid/strong acid, acid/base, acid/conjugate base, weak base/strong base or salt/base. In general, an acid/base reagent combination and a corresponding composition ratio thereof may be used to prepare buffers with varying pH values. However, a weak acid/strong acid reagent combination may be used primarily to prepare acidic buffer solutions of pH 2 to pH 4, and a weak base/strong base reagent combination may be used primarily to prepare basic buffer solutions of pH 9 to pH 11, for example.

In addition, all components in the pH buffer solution may be adsorbed onto the microbeads. At this time, the pH of the microbeads may be determined according to the composition ratio of all components of the substance except for the solvent component in each pH buffer solution, for example according to the composition ratio of the compound in Table 1 below. When the sample passes through the microbeads prepared as described above, salts adsorbed on the microbeads are eluted to change pH of the sample, thereby controlling the sample to have a desired pH.

For example, in Table 1, in the case of potassium hydrogen phthalate/hydrochloric acid, potassium hydrogen phthalate is used as weak acid and hydrochloric acid is used as strong acid. The concentrations of hydrogen ion from potassium hydrogen phthalate and conjugate base are determined depending on the amount of a strong acid, hydrochloric acid to be added, thereby adjusting the pH.

According to other embodiment of the present invention, the pH of the sample can be adjusted more simply and economically by providing a device containing the above-described microbeads. The device containing microbeads 100 according to the present invention may have an inlet 10 through which a sample is injected, a channel 20 through which a pH of the injected sample is adjusted, and an outlet 30 through which the sample with the adjusted pH is discharged. It is shown as an example in FIG. 2. In addition, for example, the device as shown in FIG. 2 may be provided in plurality, and each device may be filled with microbeads having different pH, thereby providing a device capable of controlling pH of the sample in multiple. Specifically, for example, a sample may be injected into one integrated injection part, the injected sample may be simultaneously passed through a plurality of channels, respectively, and adjusted to a desired pH by pH-controlled microbeads included in each channel, and it may be discharged through each of the outlets. Such a device is more efficient because the pH of the sample can be adjusted concurrently to save time and effort.

In addition, according to another embodiment, it is possible to provide a pH adjusting system applying the above principle.

Hereinafter, embodiments of the present invention will be described in detail so that those skilled in the art can easily carry out the present invention. The present invention may, however, be embodied in many different forms and should not be construed as limited to the embodiments set forth herein.

Preparation Example: Preparation of Buffer Solution

Buffer solutions of pH 1 to 13 were prepared as shown in Table 2.

TABLE 2

| pH | Description |
|---|---|
| 1 | 50 ml (0.2M KCl) + 134 mL (0.2M HCl) |
| 2 | 100 mL (0.1M KH2PO4) + 99.0 mL (0.1M HCl) |

TABLE 2-continued

| pH | Description |
|---|---|
| 3 | 100 mL (0.1M KH2PO4) + 44.6 mL (0.1M HCl) |
| 4 | 100 mL (0.1M KH2PO4) + 0.2 mL (0.1M HCl) |
| 5 | 100 mL (0.1M KH2PO4) + 4.5 mL (0.1M NaOH) |
| 6 | 100 mL (0.1M KH2PO4) + 11.2 mL (0.1M NaOH) |
| 7 | 100 mL (0.1M KH2PO4) + 58.2 mL (0.1M NaOH) |
| 8 | 100 mL (0.1M KH2P04) + 93.4 mL (0.1M NaOH) |
| 9 | 100 mL (0.025M Na2B4O7•10H2O) + 9.2 mL (0.1M HCl) |
| 10 | 100 mL (0.025M Na2B4O7•10H2O) + 36.6 mL (0.1M NaOH) |
| 11 | 100 mL (0.05M NaHCO3) + 45.4 mL (0.1M NaOH) |
| 12 | 100 mL (0.05M Na2HPO4) + 53.8 mL (0.1M NaOH) |
| 13 | 50 mL (0.2M KCl) + 132 mL (0.2M NaOH) |

Example and Comparative Example

To prepare pH-controlled microbeads, 200 mg of silica-based glass microbeads (average particle size 150-210 μm) were incubated in 5 mL of each buffer solution according to the above preparation example. Thereafter, the solvent component was volatilized under a nitrogen gas ($N_2$) atmosphere to prepare microbeads having respective pH concentrations. The microbeads according to Examples and Comparative Examples were prepared with varying the temperature at which the solvent component was volatilized. Specifically, the microbeads according to Comparative Example 1 were prepared at room temperature, the microbeads according to Example 1 were prepared at 50° C., and the microbeads according to Comparative Example 2 were prepared at 90° C.

Experimental Example

The pH of the sample was measured after calibration of pH of the pH measuring instrument (S220 SevenCompact™ pH/Ion (METTLER TOLEDO)) by using a sample of pH 4, 6, 9 and 10 as a reference standard solution. After passing 2 mL of the sample through each of pH-controlled microbeads, the pH of the sample was measured. The results are shown in Table 3.

TABLE 3

| | | Comparative Example 1 (R.T.) | | Example 1 (50° C.) | | Comparative Example 2 (90° C.) | |
|---|---|---|---|---|---|---|---|
| pH of beads | pH of sample before passing through beads | pH of sample after passing through beads | Deviation | pH of sample after passing through beads | Deviation | pH of sample after passing through beads | Deviation |
| 1 | 7.7 | 3.7 | −2.7 | 2.5 | −1.5 | 8.2 | −7.2 |
| 2 | 7.7 | 1.1 | 0.9 | 2.6 | −0.6 | 2.9 | −0.9 |
| 3 | 7.7 | 2.1 | 0.9 | 3.5 | −0.5 | 3 | 0 |
| 4 | 7.7 | 3.8 | 0.2 | 4.7 | −0.7 | 3.1 | 0.9 |
| 5 | 7.7 | 6.8 | −1.8 | 5.5 | −0.5 | 6.9 | −1.9 |
| 6 | 7.7 | 6 | 0 | 5.9 | 0.1 | 6 | 0 |
| 7 | 7.7 | 7.1 | −0.1 | 7 | 0 | 7.1 | −0.1 |
| 8 | 7.7 | 8.2 | −0.2 | 7.9 | 0.1 | 8.2 | −0.2 |
| 9 | 7.7 | 8 | 1 | 8.9 | 0.1 | 9 | 0 |
| 10 | 7.7 | 8.9 | 1.1 | 9.9 | 0.1 | 9.4 | 0.6 |
| 11 | 7.7 | 9.7 | 1.3 | 10.7 | 0.3 | — | — |
| 12 | 7.7 | 10.8 | 1.2 | 10.8 | 1.2 | 11.4 | 0.6 |
| 13 | 7.7 | 11.7 | 1.3 | 11.7 | 1.3 | 12.4 | 0.6 |

The results according to Table 3 are shown in FIG. 3. As shown in Table 3 and FIG. 3, it can be seen that there is a difference in the results of using each microbead depending on the change of temperature in the manufacturing process. In particular, it can be seen that the pH deviation of the sample is the smallest when using the beads according to Example 1, whereas the deviation increases significantly when using the beads according to Comparative Examples 1 and 2.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A method of controlling pH value of a sample comprising:
   introducing a sample to microbeads having a pre-determined controlled pH to adjust pH of the sample; and
   discharging the sample with the adjusted pH, wherein the adjusted pH deviates 1.5 pH units or less from the pre-determined controlled pH of the microbeads,
   wherein the microbeads have conjugated acid and conjugate base adsorbed onto Si—OH groups present on a surface of the microbeads by electrostatic interaction,
   wherein the conjugated acid and conjugate base are Hydrochloric acid/Potassium chloride, Glycine/Hydrochloric acid, Potassium hydrogen phthalate/Hydrochloric acid, Citric acid/sodium citrate, Sodium acetate/Acetic acid, Potassium hydrogen phthalate/Sodium hydroxide, Disodium hydrogen phthalate/Sodium dihydrogen orthophosphate, Dipotassium hydrogen phthalate/Potassium dihydrogen orthophosphate, Potassium dihydrogen orthophosphate/Sodium hydroxide, Barbitone sodium/Hydrochloric acid, Tris (hydroxymethyl) aminomethane/Hydrochloric acid, Sodium tetraborate/Hydrochloric acid, Glycine/Sodium hydroxide, Sodium carbonate/Sodium hydrogen carbonate, Sodium tetraborate/Sodium hydroxide, Sodium bicarbonate/Sodium hydroxide, Sodium hydrogen orthophosphate/Sodium hydroxide, Potassium chloride/Sodium hydroxide, KCl/HCl, $KH_2PO_4$/HCl, $KH_2PO_4$/NaOH, $Na_2B_4O_7 \cdot 10H_2O$/HCl, $Na_2B_4O_7 \cdot 10H_2O$/NaOH, $NaHCO_3$/NaOH, $Na_2HPO_4$/NaOH, or KCl/NaOH,
   and wherein an average diameter of the microbeads is from 100 μm to 300 μm.

2. The method of claim 1, wherein the method does not include adding acid or base continuously to adjust the pH of the sample.

3. The method of claim 1, wherein the method does not include an additional valve system to adjust pH of the sample.

4. The method of claim 1, wherein the sample is introduced through an inlet and passed through a channel which contains the microbeads to adjust the pH of the sample, and the sample with the adjusted pH is discharged via an outlet.

5. The method of claim 1, wherein the pre-determined controlled pH of the microbeads is a specific pH of 1 to 13.

6. The method of claim 1, wherein the microbeads are silica-based glass microbeads.

* * * * *